Sept. 9, 1958  F. KAPLOWITZ ET AL  2,850,796
METHODS FOR COLD-WORKING PIPING, TUBING AND THE LIKE
Filed April 27, 1955

INVENTOR.
FRED KAPLOWITZ AND
MARIO VILELLA
BY
LeRoy Greenspan
ATTORNEY

United States Patent Office 2,850,796
Patented Sept. 9, 1958

2,850,796

METHODS FOR COLD-WORKING PIPING, TUBING AND THE LIKE

Fred Kaplowitz and Mario Vilella, Spring Valley, N. Y.

Application April 27, 1955, Serial No. 504,132

1 Claim. (Cl. 29—421)

This invention relates to improved methods for fabricating pipelines, tubes, ducts and the like, hereinafter referred to as pipelines, and to improved methods for assembling lengths of pipe tube and the like, hereinafter referred to as pipe, into pipelines. The invention also relates to methods for assembling pipelines comprising a lining and a casing, and to methods for reclaiming dented and deformed pipe.

Those skilled in the art, know of the hardships and the difficulties of making leak-proof, strong, durable pipe joints, especially in pipelines having large diameters and pipeline extending for great distances. Furthermore, the presence of imperfections, burrs, projections and miscellaneous defects on the interior surface of the pipeline induces undesirable turbulence in the transported fluid with a consequent loss in line pressure. The cost of welding and threading techniques for joining lengths of pipe is often prohibitive and sometimes difficult to accomplish in rugged terrains, in swampy regions, under water, in confined locations, near hazardous chemicals, under cover in warlike conditions or in emergency action to provide water to drought areas or similar circumstances.

It is frequently desired to reclaim dented, bent and otherwise deformed pipes and tubes. The cost of reclaiming such pipes by previously known techniques is often prohibitive. Again, it is often desired to assemble a pipeline having a casing and a lining, which lining may be of the same or a different composition than the casing. Such lining is most often inserted in the casing members at the factory during the fabrication of the pipe, requiring special techniques in the field to connect the lined casing members.

It is an object of this invention to provide improved methods for assembling pipelines, the bore of said pipelines being substantially uniform within predetermined tolerances.

Another object is to provide improved methods of attachment of sections of pipe to one another or to various shaped objects, such as sheets, plates or flanges, where the pipe or tubing passes through said objects.

Another object is to provide improved methods for assembling and attaching pipe to other structural bodies where limited space or other conditions makes ordinary welding or fitting techniques difficult or impossible to carry out.

Another object is to provide improved methods for assembling and attaching pipe members to structural members or to other pipe members in underwater operations where welding and fitting techniques are difficult or impractical.

A further object is to improve the manufacture of coaxial pipe of two different compositions by forming an internal airtight surface between the inner and outer portion of said coaxial pipe.

Another object is to provide improved methods for reclaiming dented, bent or otherwise deformed pipe to a useable condition having a uniform bore of predetermined cross-section.

Another object is to provide improved methods for cold-working pipe and tubing of various metallic compositions.

Another object is to provide improved methods for shaping pipe or tubing to a predetermined cross-section and a uniform bore.

Generally, a feature of the invention is the use of an internal travelling mandrel propelled through sections of pipe by fluid pressure. The mandrel is somewhat larger in size than the bore through which it travels and therefore exerts a powerful expansive force on the walls of the pipe, permanently enlarging the pipe to the size and cross-section of the mandrel. Thus, coaxial male and female ends of adjacent pipe sections or coaxial pipe and lining sections may be joined into a substantially unitary structure by permanently expanding the internal coaxial member such that the external coaxial member is stressed in tension around said expanded internal member.

According to another feature of the invention, dented and otherwise deformed pipe may be salvaged and restored to a substantially uniform bore of a desired cross-section by propelling a mandrel therethrough by fluid pressure.

The invention will be more fully described in the following detailed description when read in conjunction with the drawings in which:

Figures 1(A) and 1(B) are partially-sectional, partially-schematic, elevational views of apparatus illustrating an improved method for assembling pipe according to one embodiment of the invention.

Similar reference characters are used for similar components throughout the drawings.

Figure 1A:
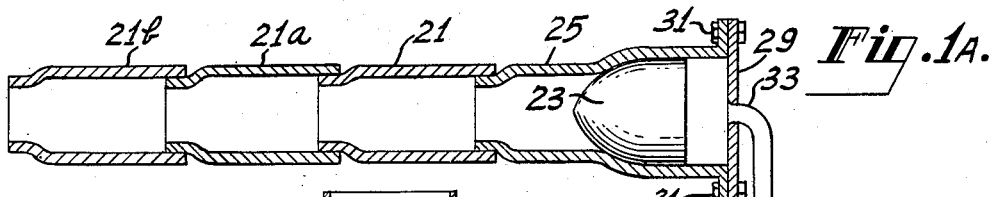
Figure 1B:
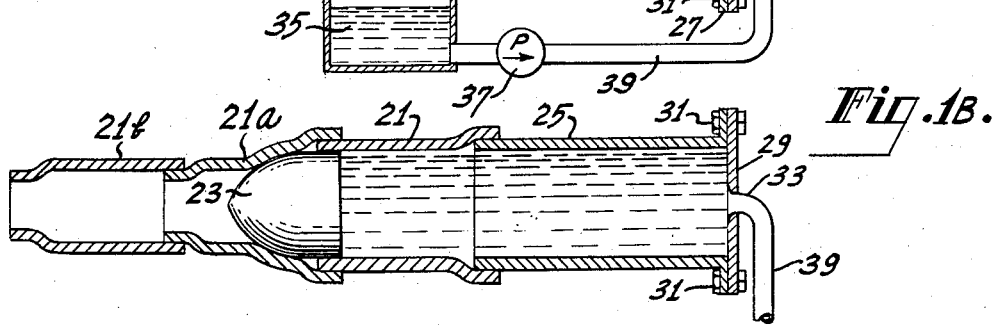

*Example 1.*—There will now be described a method for joining a plurality of pipe members to form a pipeline. Referring to Figures 1(A) and 1(B), there is provided a plurality of pipe members 21, 21a, 21b, etc., each pipe member having a body of substantially uniform inside cross-section. A short length at one end of each pipe member has an outside cross-section smaller than the inside cross-section of the body of the pipe member, which smaller outside cross-section will fit loosely and coaxially within the larger inside cross-section of the larger end of another similar pipe member. The end of the pipe member with the smaller outside cross-section is hereinafter referred to as the male end, and the end of the pipe member with the larger inside cross-section is hereinafter referred to as the female end of the pipe member. Such pipe members may be prepared at the pipe factory or in the field by methods well-known in the pipe fabricating art as by rolling one end to reduce the cross-section thereof. The pipe members may be of any malleable material, such as stainless steel, malleable iron, copper, tin, silver and aluminum; and may be any bore and wall thickness. Standard pipe member with bores up to 24 inches are convenient. The pipe members 21, 21a, 21b, etc. are now assembled into a line by inserting the male end of each pipe member into the female end of another successive pipe member.

A mandrel 23 is inserted into the female end of the end pipe member 21 of the line of pipe. The mandrel 23 may be of any convenient shape but is, preferably, torpedo-shaped. The optimum curvature of the nose of the mandrel 23 depends on the particular purpose and the particular materials with which it is used. The transverse cross-section of the mandrel 23 may be any shape. However, it is preferred that the transverse cross-section be round to produce pipelines having a circular cross-section which are most commonly used. The mandrel 23 has a transverse cross-section approximately identical with the desired cross-section, or bore, of the completed pipeline. Because the material of the pipe members contracts slightly after the mandrel passes through, the transverse cross-section of the mandrel 23 should be slightly larger than the desired cross-section of the finished pipeline. The amount of oversize depends upon the amount of contraction exhibited by the particular material used. The mandrel 23 may be made of any convenient material which does not deform during the process of the invention. Hard or hardened metals, or case-hardened steel are preferred although tungsten carbide, boron carbide, porcelain or other ceramic material may also be used.

Because the mandrel 23 ordinarily has a somewhat larger transverse cross-section than the inside cross-section of the end pipe member 21, some difficulty may be encountered in inserting the mandrel 23 into the end pipe member 21 at the outset of the process. One method for overcoming this difficulty is to insert the mandrel 23 into the end pipe member 21 by mechanical force or pressure before the pipeline is assembled.

The mandrel 23 may be pressed into the end pipe member 21, where the mandrel 23 and pipe member 21 provide a snug fit or where the mandrel 23 is only slightly larger than the inside cross-section of the end pipe member 21. Where a larger expansion to the pipe is required, a series of mandrels, of increasing transverse cross-section may be inserted one after the other and driven through the pipe as will hereinafter be described.

A preferred method for inserting the mandrel 23 is to provide a starter pipe member 25 having three zones, a central zone having an inside cross-section about the same as the inside cross-section of the female end of the end pipe member 21, a male end zone having an outside cross-section about the same as the outside cross-section of the male end of the end pipe member 21 and a female end zone having an inside cross-section greater than the outside cross-section of the mandrel 23. The female end of the starter pipe member 25 is provided with a flange 27 adapted to have bolted thereto a coverplate 29 having an inlet tube 33 therethrough. The mandrel 23 is placed inside the female end zone of the starter pipe member 25 and the coverplate 29 bolted to the flange 27 with bolts 31.

The male end of the starter member 25 is inserted in the female end of the end pipe member 21 and the inlet tube 33 is connected to a reservoir of a fluid through a piping system 39 including a pump 37. The fluid may be a compressed gas such as air, nitrogen or steam; or it may be a liquid such as crude petroleum, gasoline or kerosene. The preferred fluid is water. The fluid is pumped by the pump 37 into the starter member 25 propelling the mandrel 23 forward. The mandrel 23 enters the more constricted cross-section of the line of pipe and exerts a powerful expansive force as it travels therethrough, permanently enlarging the cross-section of the pipe members into a substantially unitary structure. Thus, by propelling the mandrel through the line of assembled pipe members by means of a fluid under pressure, several operations are accomplished at one time without the need for welding, threading and so forth.

The mandrel 23 may be stopped, started or be propelled at any desired rate by controlling the rate at which the fluid 35 is pumped. Thus, the mandrel 23 may travel through a single pipe member or through several miles of assembled pipe members. The mandrel 23 may be propelled with equal facility through straight lines of pipe members or through lines having curves, bends, in close quarters, underwater, in hazardous conditions and so forth. When the mandrel 23 reaches the end of its travel, the assembled pipeline is clean, full of fluid and ready for use. If the fluid driving the mandrel 23 is the fluid to be transported, the pipeline is in use during assembly. For example, if gasoline is utilized to propel the mandrel 23, the propelling gasoline is itself transported by the pipeline during its assembly. In the case of long distance pipelines, the pumps of the booster pumping stations may be utilized to pump the fluid to be transported during the assembly of the pipeline.

Upon reaching the end of the pipeline, the mandrel 23 is removed from the pipeline and the assembled pipeline connected to tanks, reservoirs and the like in the conventional manner.

Figure 2:
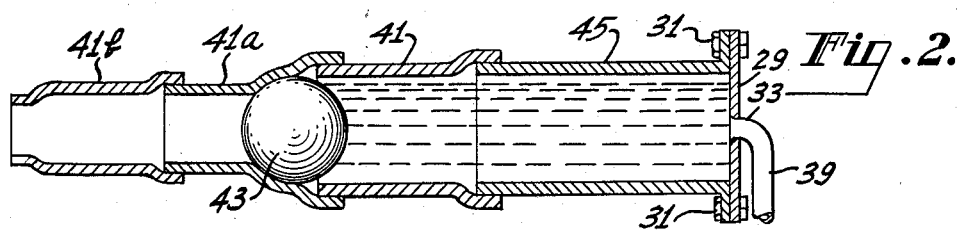
Figure 2 is a partially-schematic, partially-sectional, elevational view of apparatus illustrating an improved method for assembling pipe according to another embodiment of the invention.

*Example 2.*—There will now be described another embodiment of the invention. Referring to Figure 2, there is provided a plurality of pipe members 41, 41a, 41b, etc., each pipe member having a body of substantially uniform outside cross-section. A short length at one end of each of the pipe members has a larger inside cross-section than the outside cross-section of the body of the pipe member, which larger cross-section will fit loosely and coaxially around the smaller end of another similar pipe member. The end of the pipe member with the smaller outside cross-section is hereinafter referred to as the male end of the pipe member and the end of the pipe member with the larger inside cross-section is hereinafter referred to as the female end of the pipe member. The procedure is carried out in a manner similar to the procedure of Example 1 except that a spherical mandrel 43 is used and the starter pipe member 45 requires only two zones, i. e., a zone with an inside cross-section larger than the transverse cross-section of the mandrel 43 and a zone with an inside cross-section smaller than the transverse cross-section of the mandrel 43.

According to another embodiment of the invention, the pipe members may comprise a body section of substantially uniform cross-section, a male end reduced in cross-section and a female end enlarged in cross-section, such that the male end of one pipe member will fit into the female end of another similar pipe member.

Figure 3:
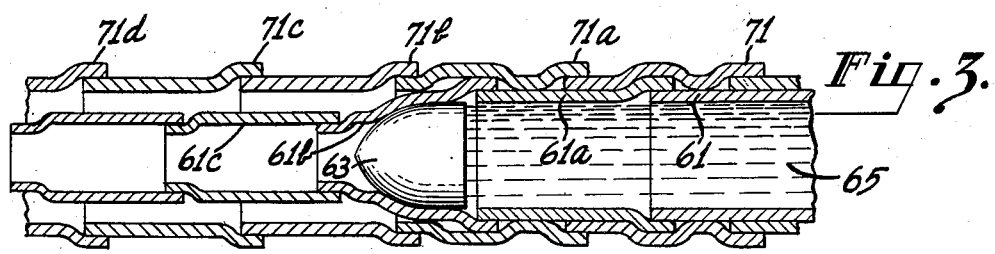
Figure 3 is a partially-schematic, partially-sectional, elevational view of apparatus illustrating an improved method for assembling lined pipe according to another embodiment of the invention.

*Example 3.*—The invention includes also methods for assembling a pipeline, said pipeline comprising a casing and a lining. Referring to Figure 3, a plurality of lining members 61, 61a, 61b, etc., each lining member being of the same general contour as the pipe members 21, 21a, 21b, etc., of Figures 1(A) and 1(B), are assembled into a line of pipe by inserting the male ends of each lining member into the female end of a similar successive lining member. A plurality of pipe casing members 71, 71a, 71b, 71c, etc., each casing member being of the same general contour as the pipe members 41, 41a, 41b, etc. of Figure 2, are assembled into a line of pipe around and coaxial with the casing members 61, 61a, 61b, etc., by inserting the male end of each casing member into the female end of a successive casing member. There are now a line of casing members 71, 71a, 71b, etc., around and coaxial with a line of lining members 61, 61a, 61b, etc. It is preferred that the joint between two adjoining lining members occurs approximately in the middle of a casing member and that the joints between two adjoining casing members occurs approximately in the middle of a lining member. In this way, the joints in the lining and casing are staggered. The lining and casing members may be of the same or of different materials. For example, both may be malleable iron or the lining may be stainless steel and the casing malleable iron.

A mandrel 63 is inserted into the end casing member and propelled therethrough by a fluid 65 in the manner described in Example 1. The mandrel 63 is of the desired cross-section and of sufficient size that when propelled through the line of lining members, both lining and casing members are expanded into a substantially unitary structure having a substantially uniform cross-section.

Figure 4:
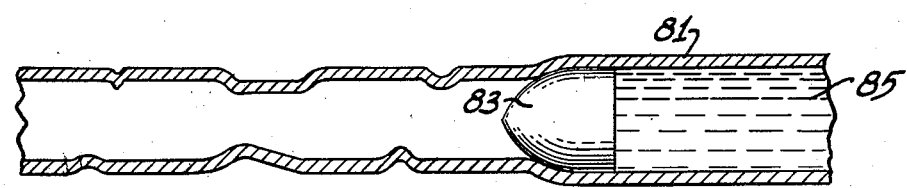
Figure 4 is a partially-schematic, partially-sectional, elevational view of apparatus illustrating an improved method for straightening bent or dented or deformed pipe.

*Example 4.*—The invention includes also methods for reclaiming dented, bent or otherwise deformed pipe. Referring to Figure 4, a mandrel 83 of the desired transverse cross-section is inserted into a dented pipe member 81 and propelled therethrough by a fluid 85 in the manner described in Example 1.

The methods of the invention may also be used to enlarge the bore of pipe members to a desired larger bore. Similarly, the bore of existing pipelines may be enlarged by the method of the invention. The methods of the invention may also be utilized to connect pipe or tubing to a plate through which it passes by expanding the pipe or tubing into the hole.

Because the methods of the invention includes the cold-working of metals, the pipe and tubing materials are preferably of the type that are easily cold-worked. The amount of cold-working which the pipes or tubing will stand may be determined by the metallurgy and chemistry of the materials. The invention contemplates the use of materials, both metals and non-metals, which are subject to deformation by cold-working.

There have been described improved methods for cold-working pipe members of metals and non-metals which methods may be utilized for joining said pipe members to other pipe members or other structures, for assembling pipelines, for lining pipelines, for reclaiming dented and otherwise deformed pipe and for enlarging the bore of pipe members. Threading, welding and other metal working techniques ordinarily used for joining pipe members are eliminated. Pipe members may be joined in the most confined locations and under the most adverse conditions by the improved processes of the invention.

What is claimed is:

A method for assembling pipeline comprising a casing and a lining including the steps of assembling a line of lining members, each lining member having a female end, and a male end adapted to fit loosely and coaxially within the female end of another similar lining member, by inserting the male end of each lining member into the female end of each successive lining member; assembling a line of casing members around and coaxially with said line of lining members, each casing member having a female end, and a male end adapted to fit loosely and coaxially within the female end of another similar casing member, by inserting the male end of each casing member into the female end of a successive casing member; inserting into the female end of the end lining member a mandrel of sufficient size to permanently expand the lining members and the coaxial portions of the casing members into a substantially unitary structure when propelled therethrough and then hydraulically propelling said mandrel through the interior of said line of lining members thereby joining said casing and lining members into a lined pipeline having a substantially uniform bore.

References Cited in the file of this patent

UNITED STATES PATENTS

| 167,688 | Puffer | Sept. 14, 1875 |
| 633,430 | Crowden | Sept. 19, 1899 |
| 714,903 | Hinds | Dec. 2, 1902 |
| 895,412 | Badger | Aug. 11, 1908 |
| 942,184 | Persons | Dec. 7, 1909 |

FOREIGN PATENTS

| 676,569 | Great Britain | July 30, 1949 |